Patented Nov. 27, 1928.

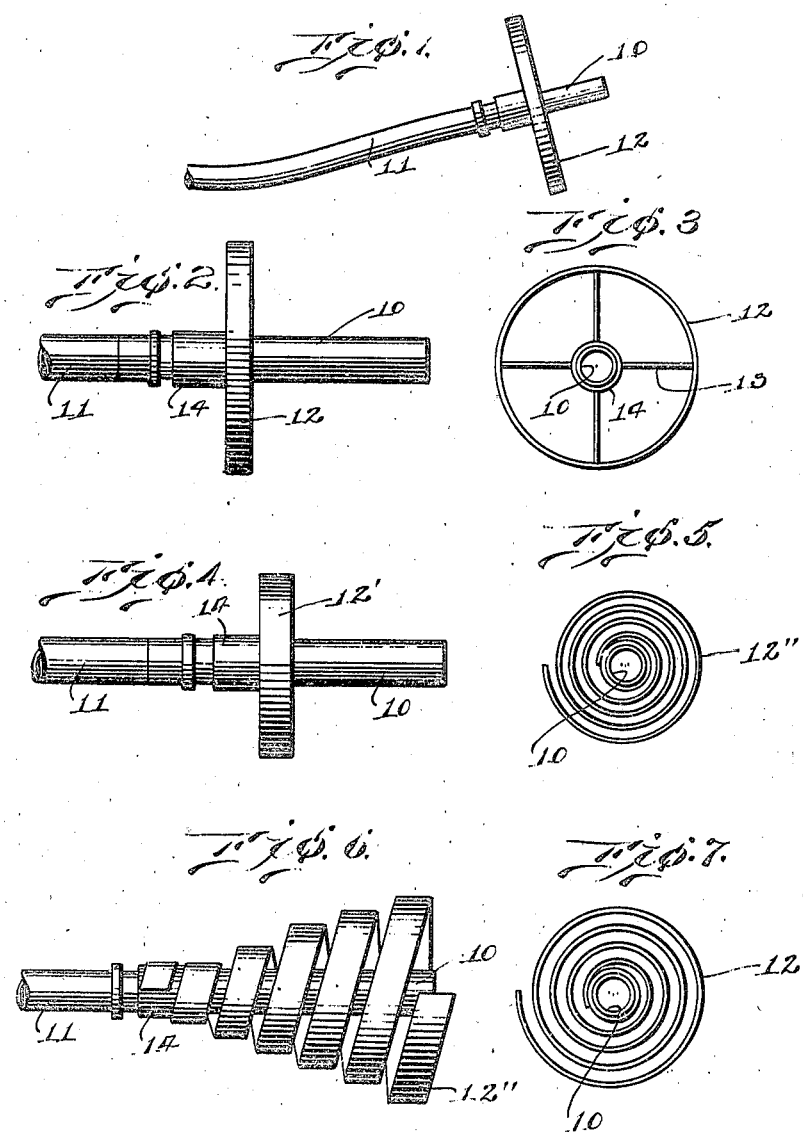

1,693,459

UNITED STATES PATENT OFFICE.

CHARLES L. PAULUS AND ROBERT KAUCH, OF DAYTON, OHIO.

HOSE-NOZZLE GUARD.

Application filed March 5, 1925. Serial No. 13,408

This invention relates generally to a means for protecting the end of a hose or pipe, and is more particularly concerned with a guard for the nozzle of a filler hose used in dispensing gasoline, oil, water, or other liquids.

The principal object of the invention is to provide a means for keeping the nozzle on the end of the hose or pipe elevated off the ground when the hose is dropped, laid down, or dragged, so that dirt is prevented from getting into the nozzle and being later transferred to the gasoline tank or other container, into which it may be placed when dispensing liquid thereto.

Another object is to provide a guard of a form which although efficient for the purpose described, will not constitute an incumbrance to the introducing of the nozzle into confined or restricted spaces for insertion into the tank or other container, the guard being preferably resilient to permit compression and being axially yieldable or distortable.

The invention is illustrated in several embodiments in the accompanying drawing, in which Fig. 1 is a view of the end of a hose showin one form of guard for the nozzle on the end of the hose.

Fig. 2 is a side view of the nozzle and guard.

Fig. 3 is a front view of Fig. 2.

Fig. 4 is a view similar to Fig. 2 showing another form of guard.

Fig. 5 is a front view of Fig. 4.

Fig. 6 is a side view of still another embodiment of the invention, and

Fig. 7 is a front view of Fig. 6.

Throughout the views the same or similar reference numerals are applied to corresponding parts.

It is well known that considerable precaution is exercised toward preventing dirt or sediment passing from the gasoline tank of automobiles, airplanes and the like, to the carburetor where such foreign matter in the fuel would interfere with the proper operation of the engine. Strainers are provided at one or more places which can be removed and cleaned or inspected from time to time. However, no protection has been made so far as we are aware, to prevent the introduction of dirt into the tank due to careless handling of the filler hose. These hoses frequently are carelessly dropped or laid down or even dragged, allowing the nozzle which is wet with gasoline or other liquid, that is being dispensed, to pick up considerable dirt. This dirt is then conveyed to the gasoline tank or other container when the nozzle is inserted for filling.

We have provided a guard to insure against the nozzle coming into contact with the ground in case the hose is laid down or dropped, the guard being of such a form as to enable the easy introduction of the nozzle into the filler opening of the tank, even where the opening may be in a rather inaccessible place. It is appreciated that the invention may find application in other connections, as for example, in the case of garden hoses, in which case the guard will serve merely to tilt the nozzle at the end of the hose for better distribution of the spray.

Referring to the drawing and for the present more particularly to Figs. 1 and 3, the nozzle 10 on the end of the hose 11 is shown fitted within a ring guard 12 supported by spokes 13 from a hub 14 secured in any suitable manner upon the nozzle 10, at a convenient distance from the free end. The parts are so proportioned that they will assume the position shown in Fig. 1, in case the hose is dropped, the nozzle being held elevated out of contact with the ground. The displacement of the ring 12 from the end of the nozzle is made with a view to enabling the easy introduction of the nozzle into the filler opening of the gasoline tank or other container. When the hose rests on the ground as illustrated, the end is free to roll laterally and any twist occuring in the hose is relieved.

In Figs. 4 and 5 we have shown a guard 12' for the nozzle 10 in the form of a spiral spring of properly tempered steel to permit axial distortion or radial compression or lateral deflection, as might be found desirable in certain cases where the filler opening of the gasoline tank would prohibit the use of a rigid ring of the form previously described. The operation of this form of guard is otherwise substantially the same as that previously described.

In Figs. 6 and 7 the guard 12" takes the form of a helical spiral spring secured at its apex to the hub 14, and extending outwardly toward the free end of the nozzle, thus protecting the entire length of the nozzle from possible contact with anything when the hose is laid down or accidentally dropped. At the same time the spring is axially distortable to substantially the form of the spring 12" to permit introduction of the nozzle into the gasoline tank or other container, and is likewise compressible radially or may be deflected laterally where the filler opening is otherwise inaccessible. Otherwise the functioning of this form of guard is substantially the same as the others.

We claim:

1. In combination with a hose having a discharge nozzle, a guard in the form of a wheel mounted on and surrounding said nozzle to maintain the nozzle above the plane of said hose when the hose is laid down or dropped.

2. The combination with a hose having a discharge nozzle, an enlargement carried by and concentric with said nozzle to form a guard therefor to maintain the nozzle above the plane of said hose when the hose is laid down or dropped.

3. The combination with the nozzle of a filler hose for gasoline, oil, water or other liquids, of an enlargement surrounding the nozzle for holding the nozzle elevated when the hose is dropped, laid down or dragged.

In testimony whereof we affix our signatures.

CHARLES L. PAULUS.
ROBERT KAUCH.